United States Patent [19]

Noguchi

[11] Patent Number: 5,779,584
[45] Date of Patent: Jul. 14, 1998

[54] TRANSMISSION BELT AND METHOD OF MANUFACTURING THE SAME

[75] Inventor: Tadahiko Noguchi, Kobe, Japan

[73] Assignee: Bando Chemical Industries, Ltd., Kobe, Japan

[21] Appl. No.: 864,483

[22] Filed: May 28, 1997

[30] Foreign Application Priority Data

Jun. 19, 1996 [JP] Japan .................................. 8-158491

[51] Int. Cl.⁶ .......................... F16G 1/04; F16G 5/00
[52] U.S. Cl. .................. 474/264; 474/237; 474/238; 474/266; 474/268
[58] Field of Search ........................ 474/237, 238, 474/260, 264, 266, 268

[56] References Cited

FOREIGN PATENT DOCUMENTS 6-337038  6/1994  Japan .

Primary Examiner—William Stryjewski
Attorney, Agent, or Firm—Sixbey, Friedman, Leedom & Ferguson, P.C.; Gerald J. Ferguson, Jr.

[57] ABSTRACT

A V-ribbed belt applicable to back-face drive includes, as a belt body, an adhesion rubber layer having a rectangular section and extending in the longitudinal direction of the belt, a compression rubber layer disposed on the inner face of the adhesion rubber layer, an upper fabric layer disposed on the back face of the adhesion rubber layer as a peelable layer, and cords disposed within the adhesion rubber layer, and a mark indicating a manufacture lot number and the like is disposed on the back side of the belt body. Specifically, the mark is sandwiched between the adhesion rubber layer and the upper fabric layer. As a result, a level difference derived from the mark on the back side of the belt body is suppressed, so as to prevent a noise in driving the belt. In addition, the mark can be prevented from erasing in driving the belt on its back face. In case of necessity, for example, when it is necessary to pursue a lot, the upper fabric layer can be peeled to confirm the mark.

6 Claims, 5 Drawing Sheets

TRANSMISSION BELT AND METHOD OF MANUFACTURING THE SAME

BACKGROUND OF THE INVENTION

The present invention relates to a transmission belt applicable to back-face drive, such as a V-belt, a V-ribbed belt and a synchronous belt, for use in a multi-pulley belt transmission, and a method of manufacturing the transmission belt. More particularly, it relates to improvement in positioning a mark provided on the back side of the main body of the belt for indicating a manufacture record such as a lot number and a manufacturer.

It is well known that such a transmission belt is provided with the mark on the back face of its main body by printing or the like. The mark is used for the following purposes:

1) Definition of a part number;
2) pursuit of a lot with a problem in occurrence of the problem after the manufacture;
3) definition of a manufacturer; etc. Thus, the mark is indispensable.

On the other hand, recently, more and more belt transmissions adopt back-face drive in which the back face of the belt also drives a pulley, for example, by using a serpentine drive or the like. In addition, there are increasing demands of users of belts for cars, machine tools, etc. for noiselessness, and hence, a noise caused in driving the belt due to a level difference derived from printing the mark on the back face has become a significant problem.

For the purpose of preventing the noise in driving the belt, various propositions have been conventionally made. For example, Japanese Laid-Open Patent Publication No. 6-337038 discloses a mark transferred onto the back face of the belt by using a transfer marking material, so that a level difference derived from the mark can be made very small. Thus, the noise caused by the level difference can be suppressed.

However, in the aforementioned publication, the mark provided on the back face of the belt is very thin, and therefore, the mark can be erased in a very short period of time through contact between the back face of the belt and a pulley. As a result, it is disadvantageously difficult to pursuit a lot having a problem when the problem is found after the manufacture.

As a countermeasure for such an early erase of the mark, Japanese Laid-Open Utility Model Publication No. 56-127442 describes another technique. Specifically, the mark is inscribed in the back face of a belt, or a magnetic tape storing information such as a lot number of a belt is buried at a predetermined depth from the back face of the belt, so that the manufacture record of the belt can be known even after the back face is worn away. However, when the mark is inscribed, a noise is disadvantageously caused again at the inscribed portion in driving the belt. When the magnetic tape is buried, it cannot be guaranteed that the magnetic tape can accurately retain the initial information for the entire use period of the belt in view of the use condition where the belt is driven among plural pulleys while being bent and stretched. Accordingly, this countermeasure is unreliable for avoiding the early erase of the mark to the same extent as the aforementioned conventional technique.

SUMMARY OF THE INVENTION

The present invention was devised to overcome the aforementioned problems, and the main object is, in a transmission belt applicable to back-face drive and having a mark on its back side, improving a method of forming the mark, so that a noise in driving the belt caused by a level difference derived from the mark can be avoided, and that the mark can be prevented from being erased through the back-face drive so as to be definitely retained all through the use period of the belt.

According to this invention, in order to achieve the object, a peelable layer is provided on a back side of a belt body, so that a mark can be disposed on the inner side of the peelable layer. In case of necessity, for example, when a problem is found in the belt, the peelable layer is peeled so as to expose the mark.

Specifically, the transmission belt of this invention is applicable to back-face drive and has a mark indicating a manufacture record on a back side of a belt body as a premise.

In this transmission belt, the belt body includes a peelable layer on the back side, and the mark is disposed on an inner side of the peelable layer.

In this structure, the mark is disposed on the inner side of the peelable layer provided on the back side of the belt body, and hence, a level difference, which is conventionally caused due to the mark, can be scarcely caused. Therefore, a noise derived from such a level difference can be suppressed in the back-face drive. Also, since the mark is covered with the peelable layer, the mark is prevented from erasing through contact between the back face of the belt and a pulley. When it is necessary to confirm the mark, the mark can be exposed by peeling the peelable layer of the belt body, and thus, for example, a lot can be pursued. In this manner, the aforementioned mutually contradictory problems can be simultaneously overcome.

In one aspect of the transmission belt, in the case where the belt body includes an adhesion rubber layer having a rectangular section and extending in a longitudinal direction of the transmission belt and a fabric layer disposed on a back face of the adhesion rubber layer, the peelable layer can be the fabric layer, and the mark can be disposed between the adhesion rubber layer and the fabric layer.

In this structure, the mark is sandwiched between the adhesion rubber layer and the fabric layer, and hence, the mark is protected by the fabric layer in the back-face drive. Still, the mark can be confirmed by peeling the fabric layer from the adhesion rubber layer. Also, since the fabric layer is made from fabric such as canvas, a force to pull the fabric layer can be efficiently changed into a force to peel the fabric layer, and thus, the fabric layer can be peeled with ease. In this manner, the aforementioned effects can be specifically and appropriately attained by this structure.

In the present method of manufacturing the aforementioned transmission belt through vulcanization molding of an unvulcanized sheet for forming the adhesion rubber layer and another unvulcanized sheet for forming the fabric layer, a transfer marking material including a base member transferably having the mark is used. The mark of the transfer marking material is transferred from the base member onto one of a back face of the unvulcanized sheet for forming the adhesion rubber layer and an inner face of the unvulcanized sheet for forming the fabric layer, and then the unvulcanized sheets are laid upon each other for the vulcanization molding.

According to this method, when the unvulcanized sheet for the adhesion rubber layer and the unvulcanized sheet for the fabric layer are laid upon each other, the mark of the transfer marking material is transferred onto either the back face of the sheet for the adhesion rubber layer or the inner face of the sheet for the fabric layer. Then, the unvulcanized sheets are vulcanization-molded, so as to form the adhesion rubber layer and the fabric layer. At this point, a slight level difference is caused on the surface of the unvulcanized sheet onto which the mark is transferred, but the level difference disappears through the vulcanization molding with these sheets laid upon each other. In this manner, the aforementioned transmission belt can be specifically and appropriately manufactured by this method.

In the present method of manufacturing the aforementioned transmission belt through vulcanization molding of an unvulcanized sheet for forming the adhesion rubber layer and another unvulcanized sheet for forming the fabric layer, a marking material including a film-like base member having irregularities on both surfaces and bearing the mark is used. The marking material is sandwiched between the unvulcanized sheet for forming the adhesion rubber layer and the unvulcanized sheet for forming the fabric layer, and the unvulcanized sheets are laid upon each other, after sandwiching the marking material, for the vulcanization molding.

According to this method, when the sheet for the adhesion rubber layer and the sheet for the fabric layer are laid upon each other, the marking material including the base member bearing the mark is sandwiched between these sheets. Then, the unvulcanized sheets are vulcanization-molded, so as to form the adhesion rubber layer and the fabric layer. In this manner, the aforementioned transmission belt can be specifically and appropriately manufactured by this method. Furthermore, the marking material is sandwiched between the adhesion rubber layer and the fabric layer with the irregularities on the base member intruded into the adhesion rubber layer and the fabric layer in the direction along the thickness of the belt body. As a result, the marking material can be expanded and contracted in accordance with a flexible movement of the belt body. Accordingly, the marking material is prevented from separating from the adhesion rubber layer and the fabric layer through the expansion and contraction of the belt body.

In one aspect of the method of manufacturing the transmission belt, the marking material can include a base member having irregularities in the form of a grating on both surfaces.

In this case, when the marking material is sandwiched between the adhesion rubber layer and the fabric layer with the irregularities of the base member intruded into the adhesion rubber layer and the fabric layer in the direction along the thickness of the belt body, the marking material can sufficiently follow the flexibility of the belt body in all the directions perpendicular to the thickness of the belt body because the base member is provided with grooves or projections extending in the same direction and other grooves or projections crossing the former grooves or projections. In this manner, the aforementioned effects can be specifically and appropriately attained by this method.

In another aspect of the method of manufacturing the transmission belt, the base member has a thickness of 20 μm or less.

In this case, since the base member of the marking material has a thickness of 20 μm or less, it is possible to prevent separation of the marking material from the adhesion rubber layer and the fabric layer, which tends to be caused when the thickness exceeds 20 μm, and it is also possible to avoid a level difference on the back face of the belt body at the position of the marking material, which can be caused when the marking material cannot sufficiently follow the flexibility of the belt body under application of excessive tension.

DETAILED DESCRIPTION OF THE INVENTION

Embodiments of the present invention will now be described with reference to the accompanying drawings.

Embodiment 1

Figure 1:
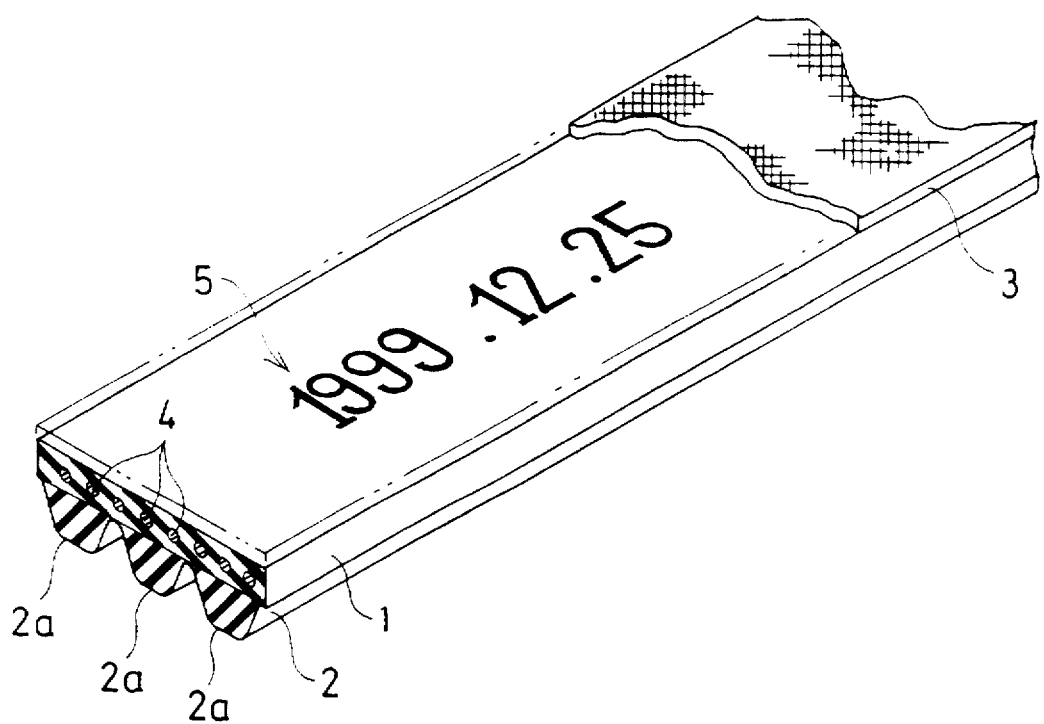
FIG. 1 is a laterally sectional view for showing the entire structure of a V-ribbed belt according to a first embodiment of the invention.

FIG. 1 shows a V-ribbed belt, i.e., a transmission belt, according to a first embodiment of the invention. The belt comprises a belt body including an adhesion rubber layer 1 having a rectangular section and extending in the longitudinal direction of the belt, a compression rubber layer 2 provided on an inner face (corresponding to a lower face in FIG. 1) of the adhesion rubber layer 1, an upper fabric layer 3 serving as a fabric layer provided on a back face (corresponding to an upper face in FIG. 1) of the adhesion rubber layer 1, and cords 4 spirally buried in the adhesion rubber layer 1 so as to extend in the substantially longitudinal direction of the belt at a predetermined distance from one another.

As a material for the rubber layers 1 and 2, a single rubber material such as NR, SBR, NBR, CR or a composite rubber material including two or more of these single rubber materials can be used. The compression rubber layer 2 is provided with a plurality of ribs 2a (in this embodiment, three ribs 2a as shown in FIG. 1) extending in the longitudinal direction of the belt at a predetermined distance from one another in the lateral direction. As a material for the upper fabric layer 3, canvas such as bias canvas and wide-angle canvas is processed with rubber cement. As a material for the cord 4, any of natural fiber such as silk, synthetic fiber such as PET, nylon, aromatic polyamide, and inorganic fiber such as glass and carbon can be used.

Figure 2:
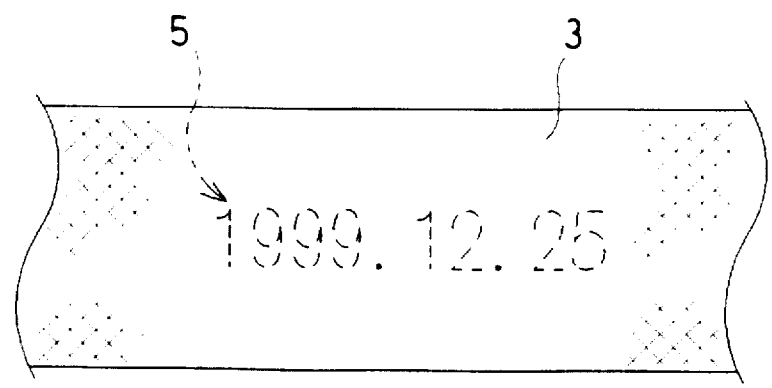
FIG. 2 is a perspective view of the V-ribbed belt in which the belt is cut in the lateral direction and an upper fabric layer is partly removed.
Figure 3:
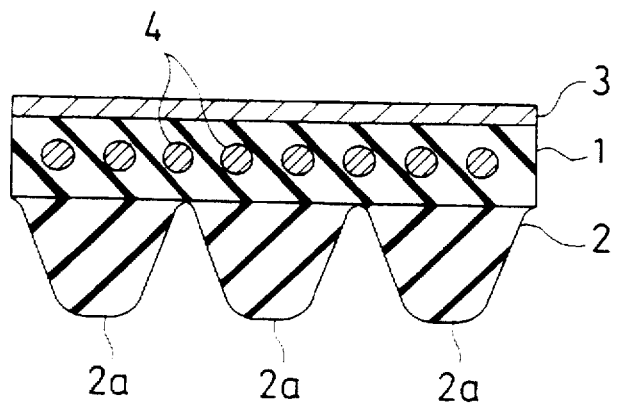
FIG. 3 is a plan view of a main part of a back face of the V-ribbed belt.

As is shown in FIGS. 2 and 3, on the inner side of the upper fabric layer 3 of the belt body of this embodiment, a mark 5 for indicating a lot number in the manufacture of the belt and the manufacturer of the belt, etc. is disposed. In this embodiment shown in FIGS. 2 and 3, the mark 5 is "1999. 12. 25" corresponding to the production date of the belt. Specifically, the mark 5 is disposed between the adhesion rubber layer 1 and the upper fabric layer 3.

Figure 4:
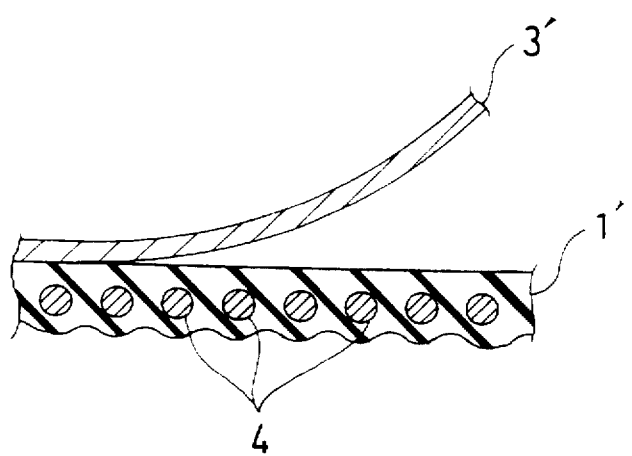
FIG. 4 is a sectional view for showing a method of forming a mark.

Now, a method of forming the mark 5 in the manufacture of the V-ribbed belt will be described with reference to FIG. 4.

First, the fundamental manufacturing process of the V-ribbed belt will be briefly described. A molding drum having a plurality of rib grooves on its outer peripheral face is used. An unvulcanized compression rubber sheet for forming the compression rubber layer 2, an unvulcanized adhesion rubber sheet 1' for forming the adhesion rubber layer 1, the cords 4 and an unvulcanized fabric sheet 3' for forming the upper fabric layer 3 are successively wound around the outer peripheral face of the molding drum, so that these sheets are vulcanization-molded into a cylindrical belt mold. Then, the belt mold is cut into a predetermined belt width, and thus, the V-ribbed belt can be manufactured.

In this embodiment, a transfer marking material (not shown) transferably having the mark in its base member is used in forming the mark 5. The mark 5 of the transfer marking material is transferred onto either the back face (corresponding to the upper face in FIG. 4) of the adhesion rubber sheet 1' or the inner face (corresponding to the lower face in FIG. 4) of the fabric sheet 31, and then the fabric sheet 3' is laid over the adhesion rubber sheet 1' for the vulcanization molding. In this manner, the mark 5 is sandwiched between the adhesion rubber layer 1 and the upper fabric layer 3.

Thus, in this embodiment, the mark 5 conventionally disposed on the back side of the V-ribbed belt is sandwiched between the adhesion rubber layer 1 and the upper fabric layer 3. Accordingly, as compared with the case where the mark 5 is bared on the back side of the belt, a level difference can be scarcely caused due to the mark 5 formed on the back face of the belt. As a result, a noise derived from such a level difference can be prevented in driving the belt on its back face. In addition, since the mark 5 is covered with the upper fabric layer 3, the mark 5 can be prevented from being erased through contact between the back face of the belt and a pulley.

When it is necessary to confirm the mark 5, for example, when a problem is found in the V-ribbed belt, the mark 5 can be exposed by peeling the upper fabric layer 3 by pulling it from the end thereof, and thus, the lot having the problem can be pursued. Additionally, since the upper fabric layer 3 is made from fabric such as canvas, a force to pull the upper fabric layer 3 can be efficiently changed into a force to peel the upper fabric layer 3, and hence it can be peeled with ease.

In the first embodiment, the mark 5 is positioned between the adhesion rubber layer 1 and the upper fabric layer 3, but the position of the mark 5 can be appropriately determined in accordance with the structure of a belt.

Furthermore, in the first embodiment, the mark 5 is formed by using the transfer marking material, but the method of forming the mark 5 is not limited to this method.

In addition, the description is given on the V-ribbed belt in the first embodiment, but the invention can be applied to any other transmission belt applicable to back-face drive.

Embodiment 2

Figure 5:
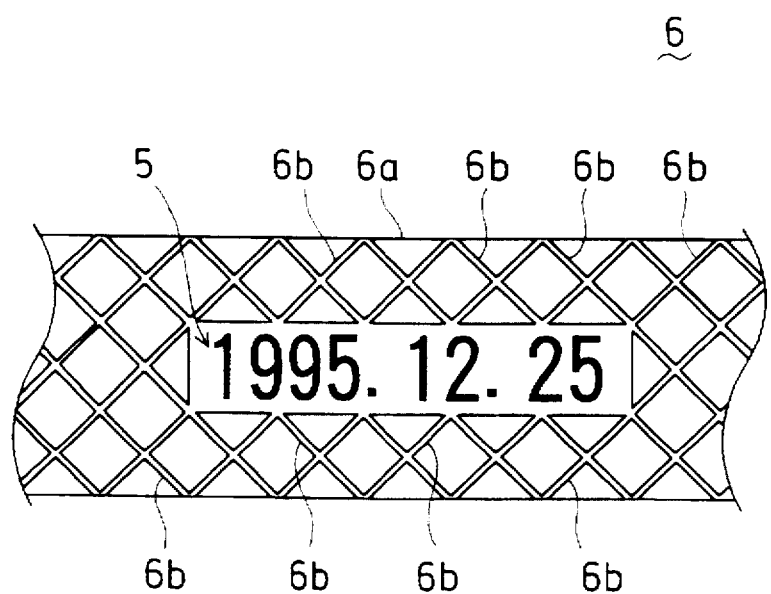
FIG. 5 is a plan view for showing a marking material which is to be buried in a belt body of a V-ribbed belt according to a second embodiment of the invention.

FIG. 5 shows a main part of a V-ribbed belt according to a second embodiment. Also in this embodiment, a mark 5 is sandwiched between an adhesion rubber layer 1 and an upper fabric layer 3 as in the first embodiment.

In forming the mark 5 in the second embodiment, a marking material 6 including a film-like base member 6a having irregularities on both surfaces and bearing the mark 5 is used. Specifically, the base member 6a is a film with a thickness of, for example, 20 μm, and has plural grooves or projections 6b in the form of a grating on both surfaces. Apart from the marking material 6, the V-ribbed belt of this embodiment has the same structure as that of the first embodiment, and the description is omitted.

Now, a method of forming the mark 5 by using the marking material 6 will be described. In the manufacture of the belt, the marking material 6 is sandwiched between an unvulcanized adhesion rubber sheet 1' and an unvulcanized fabric sheet 3', and then the adhesion rubber sheet 1' and the fabric sheet 3' are vulcanization-molded. Thus, the mark 5 on the marking material 6 is buried between the adhesion rubber layer 1 and the upper fabric layer 3 together with the base member 6a.

Accordingly, this embodiment can attain the same effects as those of the first embodiment. In addition, through the vulcanization molding, the marking material 6 can be sandwiched between the adhesion rubber layer 1 and the upper fabric layer 3 with the grooves or projections 6b of the base member 6a intruded into the adhesion rubber layer 1 and the upper fabric layer 3 in the direction along the thickness of the belt body. This can allow the marking material 6 to expand and contract in accordance with the flexible movement of the belt body. Therefore, even when the V-ribbed belt is supplied with excessive tension, the marking material 6 can be prevented from separating from the adhesion rubber layer 1 and the upper fabric layer 3. Since the grooves or projections 6b of the base member 6a are formed in the form of the grating, the marking material 6 can sufficiently follow the expansion and contraction of the belt body in all the directions perpendicular to the thickness of the belt body.

In addition, the thickness of the base member 6a of the marking material 6 is suppressed to 20 μm. Therefore, separation from the adhesion rubber layer 1 and the upper fabric layer 3, which can be easily caused when the marking material 6 has a thickness exceeding 20 μm, can be avoided, and a level difference on the back face of the belt, which can be caused when the marking material 6 cannot sufficiently follow the flexibility of the belt body under application of excessive tension, can also be prevented.

In the second embodiment, the marking material 6 includes the base member 6a having plural grooves or projections 6b in the form of the grating on both surfaces is used, but the shape and positions of the grooves or projections 6b on the surfaces of the base member 6a are not particularly specified.

What is claimed is:

1. A transmission belt applicable to back-face drive and having a mark indicating a manufacture record on a back side of a belt body, wherein said belt body includes a peelable layer on the back side, and said mark is disposed on an inner side of said peelable layer.

2. The transmission belt of claim 1, wherein said belt body includes an adhesion rubber layer having a rectangular section and extending in a longitudinal direction of said transmission belt, and a fabric layer disposed on a back face of said adhesion rubber layer, said peelable layer is said fabric layer, and said mark is disposed between said adhesion rubber layer and said fabric layer.

3. A method of manufacturing the transmission belt of claim 2 through vulcanization molding of an unvulcanized sheet for forming said adhesion rubber layer and another unvulcanized sheet for forming said fabric layer, wherein a transfer marking material including a base member transferable having said mark is used, said mark of said transfer marking material is transferred from said base member onto one of a back face of said unvulcanized sheet for forming said adhesion rubber layer and an inner face of said unvulcanized sheet for forming said fabric layer, and said unvulcanized sheets are laid upon each other, after transferring said mark, for the vulcanization molding.

4. A method of manufacturing the transmission belt of claim 2 through vulcanization molding of an unvulcanized sheet for forming said adhesion rubber layer and another unvulcanized sheet for forming said fabric layer, wherein a marking material including a film-like base member having irregularities on both surfaces and bearing said mark is used, said marking material is sandwiched between said unvulcanized sheet for forming said adhesion rubber layer and said unvulcanized sheet for forming said fabric layer, and said unvulcanized sheets are laid upon each other, after sandwiching said marking material, for the vulcanization molding.

5. The method of manufacturing the transmission belt of claim 4, wherein said marking material includes a base member having irregularities in the form of a grating on both surfaces.

6. The method of manufacturing the transmission belt of any of claims 4 and 5, wherein said base member has a thickness of 20 μm or less.

\* \* \* \* \*